US011467581B2

(12) United States Patent
Takai et al.

(10) Patent No.: US 11,467,581 B2
(45) Date of Patent: Oct. 11, 2022

(54) AUTONOMOUS MOVING BODY FOR MOVING BETWEEN FLOORS USING AN ELEVATOR, CONTROL PROGRAM OF AUTONOMOUS MOVING BODY, METHOD OF CONTROLLING AUTONOMOUS MOVING BODY, AND SYSTEM SERVER FOR CONTROLLING AUTONOMOUS MOVING BODY FROM REMOTE PLACE

(71) Applicant: TOYOTA JIDOSHA KABUSHIKI KAISHA, Toyota (JP)

(72) Inventors: Tomohisa Takai, Nagoya (JP); Yuhei Yamaguchi, Toyota (JP); Satoshi Toyoshima, Okazaki (JP); Yuta Watanabe, Toyota (JP); Mikio Honda, Toyota (JP); Shiro Oda, Anjyo (JP); Tetsuya Taira, Nagakute (JP); Nobuhisa Otsuki, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 246 days.

(21) Appl. No.: 16/844,004

(22) Filed: Apr. 9, 2020

(65) Prior Publication Data

US 2020/0363802 A1  Nov. 19, 2020

(30) Foreign Application Priority Data

May 13, 2019  (JP) .............................. JP2019-090774

(51) Int. Cl.
*G05D 1/00*  (2006.01)
*G05D 1/02*  (2020.01)

(52) U.S. Cl.
CPC ......... *G05D 1/0088* (2013.01); *G05D 1/0214* (2013.01); *G05D 1/0251* (2013.01); *G05D 2201/0207* (2013.01)

(58) Field of Classification Search
CPC ... G05D 1/0088; G05D 1/0214; G05D 1/0251
See application file for complete search history.

(56) References Cited

U.S. PATENT DOCUMENTS 9,026,301 B2     5/2015  Zini et al.
9,563,206 B2 *   2/2017  Zini ...................... G05D 1/028
(Continued)

FOREIGN PATENT DOCUMENTS

JP    S59-153213 A    9/1984
JP    2005-018382 A   1/2005
(Continued)

*Primary Examiner* — Ramsey Refai
(74) *Attorney, Agent, or Firm* — Oliff PLC

(57) ABSTRACT

An autonomous moving body includes: a determination unit configured to determine that the autonomous moving body has arrived at a waiting area on a current floor before the autonomous moving body gets on a car of the elevator; an orientation adjustment unit configured to adjust, when the determination unit determines that the autonomous moving body has arrived at the waiting area, an orientation of the autonomous moving body based on an exiting direction from the car on a destination floor; and a movement controller configured to cause, when the car arrives, the autonomous moving body to enter the car while maintaining the orientation adjusted by the orientation adjustment unit.

12 Claims, 12 Drawing Sheets

(56) References Cited

U.S. PATENT DOCUMENTS

| | | | |
|---|---|---|---|
| 10,906,185 B2* | 2/2021 | Deyle | B25J 9/1694 |
| 10,947,084 B2* | 3/2021 | Fang | B66B 1/3461 |
| 2006/0129276 A1* | 6/2006 | Watabe | G05D 1/0234 |
| | | | 701/23 |
| 2012/0041593 A1* | 2/2012 | Ichinose | B66B 1/2458 |
| | | | 700/258 |
| 2018/0111791 A1* | 4/2018 | Fang | B66B 1/3461 |
| 2018/0253104 A1 | 9/2018 | Miyamoto et al. | |
| 2019/0018427 A1 | 1/2019 | Jeon et al. | |
| 2019/0248013 A1* | 8/2019 | Deyle | G05D 1/0212 |
| 2019/0315592 A1 | 10/2019 | Machida et al. | |

FOREIGN PATENT DOCUMENTS

| | | |
|---|---|---|
| JP | 2006-089262 A | 4/2006 |
| JP | 3968715 B2 | 8/2007 |
| JP | 5556831 B2 | 7/2014 |
| JP | 2017-004102 A | 1/2017 |
| JP | 2017-220122 A | 12/2017 |
| JP | 2017-220123 A | 12/2017 |
| JP | 2018-147081 A | 9/2018 |
| KR | 2011-0123975 A | 11/2011 |
| KR | 101287699 B1 | 7/2013 |
| KR | 10-2015-0015575 A | 2/2015 |
| KR | 101864948 B1 | 7/2018 |
| WO | 2018/066056 A1 | 4/2018 |

\* cited by examiner

AUTONOMOUS MOVING BODY FOR MOVING BETWEEN FLOORS USING AN ELEVATOR, CONTROL PROGRAM OF AUTONOMOUS MOVING BODY, METHOD OF CONTROLLING AUTONOMOUS MOVING BODY, AND SYSTEM SERVER FOR CONTROLLING AUTONOMOUS MOVING BODY FROM REMOTE PLACE

CROSS REFERENCE TO RELATED APPLICATIONS

This application is based upon and claims the benefit of priority from Japanese patent application No. 2019-090774, filed on May 13, 2019, the disclosure of which is incorporated herein in its entirety by reference.

BACKGROUND

The present disclosure relates to an autonomous moving body, a control program of the autonomous moving body, a method of controlling the autonomous moving body, and a system server for controlling the autonomous moving body from a remote place.

Conveyance robots that autonomously move between floors using an elevator installed in a facility have become gradually known (see, for example, U.S. Pat. No. 9,026,301).

SUMMARY

In a case in which an autonomous moving body moves to a destination floor using an elevator that people also get on and get off, it may be difficult for the autonomous moving body to smoothly exit from a car in a short period of time depending on a waiting posture of the autonomous moving body when the car arrives at the destination floor. At the same time, it is not desirable for the autonomous moving body to operate in a narrow car while the car is moving up and down.

The present disclosure has been made in order to solve the aforementioned problem, and provides an autonomous moving body and the like capable of smoothly exiting from a car of an elevator in a short period of time.

An autonomous moving body according to a first aspect of the present disclosure is an autonomous moving body configured to autonomously move between floors using an elevator installed in a facility, the autonomous moving body including: a determination unit configured to determine that the autonomous moving body has arrived at a waiting area on a current floor before the autonomous moving body gets on a car of the elevator; an orientation adjustment unit configured to adjust, when the determination unit determines that the autonomous moving body has arrived at the waiting area, an orientation of the autonomous moving body based on an exiting direction from the car on a destination floor; and a movement controller configured to cause, when the car arrives, the autonomous moving body to enter the car while maintaining the orientation adjusted by the orientation adjustment unit. The autonomous moving body thus constructed adjusts its orientation to the one in accordance with the exiting direction on the destination floor, whereby the autonomous moving body can smoothly exit from the car in a short period of time after the car arrives at the destination floor.

In the aforementioned autonomous moving body, the orientation adjustment unit may cause the autonomous moving body to turn so as to satisfy at least one of the criteria that the exiting direction corresponds to a front side of the autonomous moving body, it turns based on an arrangement of an environmental sensor provided in the autonomous moving body, it turns based on an arrangement of a display panel provided in the autonomous moving body, and it turns based on a shape of a housing of the autonomous moving body, thereby capable of adjusting the orientation of the autonomous moving body. By adjusting the orientation in accordance with the aforementioned criterion, the autonomous moving body is able to exit from the car more smoothly.

Further, in the aforementioned autonomous moving body, the movement controller may set, after the autonomous moving body enters the car, a position at which a rear part of the autonomous moving body is opposed to a wall surface of the car as a destination and cause the autonomous moving body to move. When the autonomous moving body waits with its back against the wall surface, the autonomous moving body is not likely to disturb people who get on and get off the car.

Further, when the car is an asymmetric space when the car is seen from a door, the movement controller may set, after the autonomous moving body enters the car, a side of the car on which there is a wide space when the car is seen from the door as a destination and cause the autonomous moving body to move. When the autonomous moving body waits in a large space, it is possible to reduce a feeling of pressure that people riding the elevator with the autonomous moving body may have.

Further, the movement controller may set, after the autonomous moving body enters the car, a position at which a camera provided in the autonomous moving body to acquire environmental information can capture images of a range wider than a predetermined reference range as a destination and cause the autonomous moving body to move. When it is possible to capture images of a wider range, it is possible to appropriately know the state in the car, whereby the autonomous moving body is able to perform an appropriate exiting action.

The orientation adjustment unit may not adjust the orientation of the autonomous moving body when an obstacle is detected inside a predetermined range from an outer frame of the autonomous moving body. According to this configuration, there is no possibility that people waiting for arrival of the car along with the autonomous moving body would contact the autonomous moving body.

A control program of an autonomous moving body according to a second aspect of the present disclosure is a control program of an autonomous moving body configured to autonomously move between floors using an elevator installed in a facility, the control program causing a computer to execute the following steps: a determination step for determining that the autonomous moving body has arrived at a waiting area on a current floor before the autonomous moving body gets on a car of the elevator; an orientation adjustment step for adjusting, when it is determined in the determination step that the autonomous moving body has arrived at the waiting area, an orientation of the autonomous moving body based on an exiting direction from the car on a destination floor; and an entering step for entering, when the car arrives, the car while maintaining the orientation adjusted in the orientation adjustment step.

A method of controlling an autonomous moving body according to a third aspect of the present disclosure is a method of controlling an autonomous moving body that autonomously moves between floors using an elevator installed in a facility, the method including: a determination step for determining that the autonomous moving body has arrived at a waiting area on a current floor before the autonomous moving body gets on a car of the elevator; an orientation adjustment step for adjusting, when it is determined in the determination step that the autonomous moving body has arrived at the waiting area, an orientation of the autonomous moving body based on an exiting direction from the car on a destination floor; and an entering step for entering, when the car arrives, the car while maintaining the orientation adjusted in the orientation adjustment step.

A system server according to a fourth aspect of the present disclosure is system server for controlling an autonomous moving body that autonomously moves between floors using an elevator installed in a facility from a remote place, the system server including: a determination unit configured to determine that the autonomous moving body has arrived at a waiting area on a current floor before the autonomous moving body gets on a car of the elevator based on environmental sensor information of the autonomous moving body received from the autonomous moving body; an adjustment instruction unit configured to transmit, to the autonomous moving body, when the determination unit determines that the autonomous moving body has arrived at the waiting area, an adjustment instruction for adjusting an orientation of the autonomous moving body based on an exiting direction from the car on a destination floor; and a movement instruction unit configured to transmit, when the car arrives, a movement instruction for causing the autonomous moving body to enter the car while maintaining the orientation adjusted by an instruction from the adjustment instruction unit to the autonomous moving body. According to the second, third, and fourth aspects as well, it is possible to cause the autonomous moving body, which is a target to be controlled, to smoothly exit from the car of the elevator.

According to the present disclosure, it is possible to provide an autonomous moving body and the like capable of smoothly exiting from a car of an elevator in a short period of time.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, the present disclosure will be explained through embodiments of the present disclosure. However, they are not intended to limit the scope of the present disclosure according to the claims. Further, all of the components/structures described in the embodiments are not necessarily indispensable as means for solving the problem.

Figure 1:
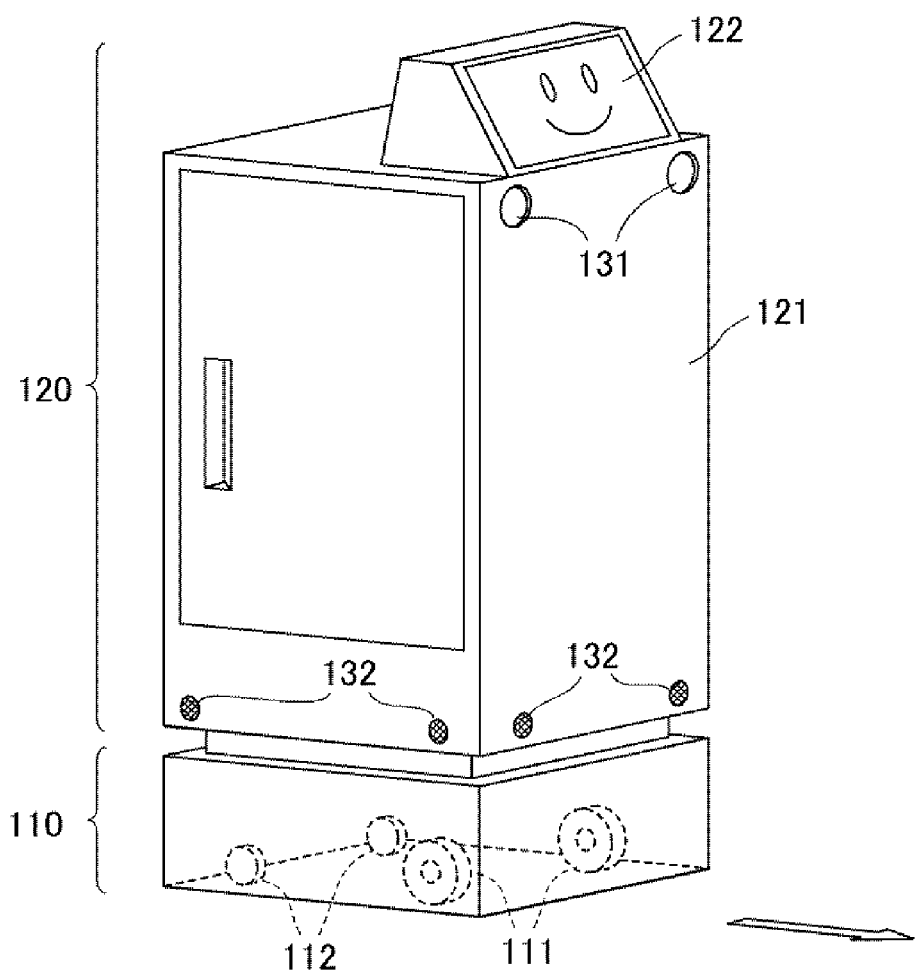
FIG. 1 is an external perspective view of a mobile robot according to an embodiment.

FIG. 1 is an external perspective view of a mobile robot 100 according to an embodiment. The mobile robot 100 is one example of an autonomous moving body capable of moving autonomously. The mobile robot 100 is able to autonomously move between floors using an elevator installed in a facility. The mobile robot 100 is mainly formed of a cart part 110 and a main body part 120.

The cart part 110 supports two driving wheels 111 and two casters 112, each of which is grounded on a traveling surface, inside a cover having a rectangular shape. The two driving wheels 111 are disposed in such a way that the rotational axes thereof match each other. The driving wheels 111 are rotationally driven independently from each other by a motor (not shown). The casters 112, which are trailing wheels, are disposed so that a turning axis extending in the vertical direction from the cart part 110 supports the wheels so that there is some space between it and the rotation axes of the wheels, and track in accordance with a movement direction of the cart part 110.

The mobile robot 100 moves straight forward when, for example, the two driving wheels 111 are rotated at the same rotational speed in the same direction, and turns about the vertical axis that passes substantially the center part of the two driving wheels 111 of the cart part 110 when the two driving wheels 111 are rotated at the same rotational speed in the opposite direction. That is, since the rotational direction and the rotational speed of the two driving wheels 111 are controlled, the mobile robot 100 can translate or turn in a desired direction.

The main body part 120 mainly includes a housing part 121 mounted above the cart part 110 and a display panel 122 installed in an upper surface part of the housing part 121. The housing part 121 forms a rectangular parallelepiped shape, and houses a shelf for accommodating objects to be transferred and a control unit for accommodating a controller and the like that will be described later. The display panel 122 is, for example, a liquid crystal panel, and displays a face of a character by illustration or presents information regarding the mobile robot 100 by text or an icon. When the display panel 122 displays a face of a character, the impression that the display panel 122 is a dummy face part is given to surrounding observers. Further, the display panel 122 includes a touch panel on the display surface and can receive an input instruction from a user.

A stereo camera 131 is installed in an upper part of the housing part 121 but is below the display surface of the display panel 122. The stereo camera 131 has a configuration in which two camera units having the same angle of view are arranged in such a way that they are separated from each other in the horizontal direction, and outputs images captured by the respective camera units as image data. In a lower part of the housing part 121, ultrasonic sensors 132 that are directed toward the horizontal direction are provided on each of the housing surfaces. The mobile robot 100 analyzes the image data output from the stereo camera 131 and detection signals output from the ultrasonic sensors 132, thereby recognizing a surrounding obstacle and the position of itself.

As shown in FIG. 1, the mobile robot 100 sets a side on which the stereo camera 131 is installed as a front side thereof. That is, in the normal traveling, as shown by an arrow, the front side of the mobile robot 100 corresponds to a traveling direction.

Regarding the way in which the front side of the mobile robot 100 is defined, various ideas may be adopted. For example, it is possible to define the front side based on the way in which an environmental sensor for recognizing the surrounding environment is arranged. Specifically, a housing surface side on which sensors having a high recognition ability are provided or a number of sensors are provided may be set as the front side. By defining the front side in this way, the mobile robot is able to move while appropriately recognizing the environment surrounding the mobile robot. In the mobile robot 100 according to this embodiment as well, a housing surface side on which the stereo camera 131 is provided is set as the front side.

Alternatively, it is possible to define the front side based on the way in which the display panel is arranged. When the display panel displays a face of a character or the like, people surrounding the mobile robot naturally recognizes that the display panel surface corresponds to the front side of the mobile robot. Therefore, when the display surface side of the display panel is set as the front side, people surrounding the mobile robot do not have a strong feeling of strangeness. The mobile robot 100 according to this embodiment also sets the display surface side of the display panel 122 as the front side.

Further, the front side may be defined based on the shape of the housing of the mobile robot 100. When, for example, the shape of the housing projected onto the traveling surface is a rectangle, the shorter side is preferably set as the front side, not the longer side so that the presence of the mobile robot 100 does not disturb people who pass the mobile robot 100 when it moves. That is, depending on the shape of the housing, there is a housing surface that is preferably set as the front side when the mobile robot 100 normally moves. In the mobile robot 100 according to this embodiment as well, the shorter side of the rectangle is set as the front side. While the mobile robot 100 defines the front side in accordance with some ideas described above, based on which particular idea the front side should be defined may be determined in consideration of the shape, the role and the like of the mobile robot.

Figure 2:
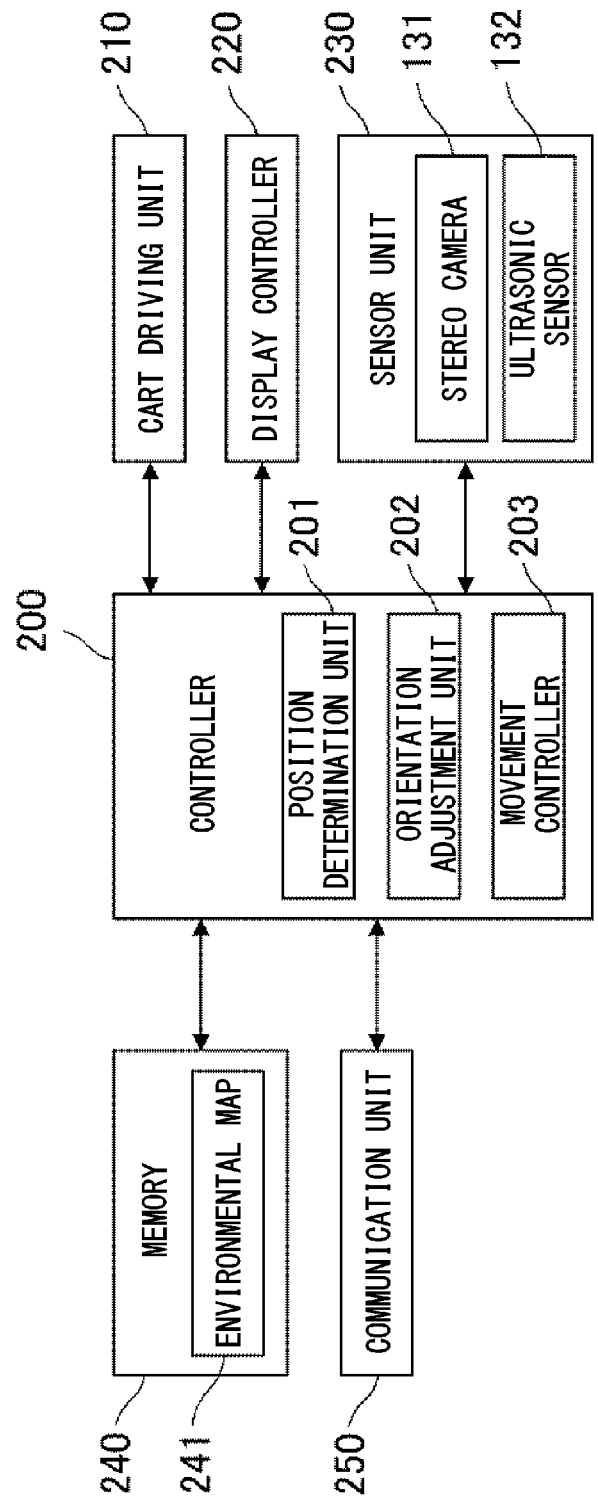
FIG. 2 is a control block diagram of the mobile robot.

FIG. 2 is a control block diagram of the mobile robot 100. A controller 200, which is, for example, a CPU, executes a control program loaded from a memory 240, thereby executing control of the entire apparatus. A cart driving unit 210 includes a drive circuit or a motor for driving the driving wheels 111. A display controller 220 generates a display video in accordance with a control signal from the controller 200, and displays the generated display video on the display panel 122. Further, the display controller 220 accepts an operation on a touch panel superimposed on the display panel 122, generates an operation signal, and transmits the generated operation signal to the controller 200.

A sensor unit 230 includes various sensors for detecting people or objects that are present around the mobile robot 100 and monitoring an object to be transferred. The stereo camera 131 and the ultrasonic sensors 132 are elements that compose the sensor unit 230. The controller 200 sends a control signal to the sensor unit 230, thereby driving various sensors and acquiring an output signal and output data of the sensors.

The memory 240, which is a nonvolatile storage medium, is, for example, a solid state drive. The memory 240 stores, besides a control program for controlling the mobile robot 100, various parameter values, functions, lookup tables and the like to be used for control. In particular, the memory 240 stores an environmental map 241 in which map information in a facility where the mobile robot 100 autonomously moves is described.

A communication unit 250 is, for example, a wireless LAN unit, and the controller 200 transmits and receives various kinds of information to and from an external system server via the communication unit 250 and a network. The controller 200 transmits, for example, a call signal to the system server when it is desired to cause the car of the elevator to come to the current floor. The system server forwards this call signal to the controller of the elevator. Further, the controller 200 acquires the latest environmental map 241 sent from the system server and stores the acquired map in the memory 240.

The controller 200 also serves as a function operation unit for executing various operations regarding control and processing. The position determination unit 201, the orientation adjustment unit 202, and the movement controller 203 are examples of the function operation unit. The position determination unit 201 determines the current location of the mobile robot 100 by comparing information from the sensor unit 230 with the environmental map 241. The orientation adjustment unit 202 sends a driving signal to the cart driving unit 210 and controls rotation of the driving wheels 111 in such a way that the orientation of the mobile robot 100 coincides with the set orientation. The movement controller 203 sends a driving signal to the cart driving unit 210 and controls rotation of the driving wheels 111 in such a way that the mobile robot 100 moves to the set destination. The specific functions of the function operation unit will be explained later.

When the mobile robot moves to the destination floor using an elevator that people also get on and get off, if the mobile robot comes to the front of the car of the elevator and gets on the car frontwards without changing its orientation, the mobile robot needs to exit from the car backwards after the car arrives at the destination floor. In this case, it may be difficult for the mobile robot to exit in a short period of time due to various factors. For example, the state of the destination floor for the mobile robot is unknown until the door of the car is opened. In this case, unless a sufficient number of environmental sensors are provided in the rear part of the mobile robot 100, it takes time to acquire a sufficient amount of environmental information to allow the mobile robot to start movement. Further, if the display panel is not directed in the direction of the door of the car, a message cannot be presented to people who are going to get on the car from the destination floor, and it is possible that communication that is necessary for the movement cannot be achieved. On the other hand, it is not preferable to adjust the orientation of the mobile robot 100 inside the car before the mobile robot 100 exits the car on the destination floor after it has got on the car since in this case the mobile robot 100 may contact other passengers. In order to solve these problems, the mobile robot 100 according to this embodiment adjusts the orientation of itself based on the exiting direction from the car on the destination floor before the mobile robot 100 gets on the car of the elevator. The process procedure in this case and the state of the mobile robot 100 will be explained in order with reference to the drawings.

Figure 3:
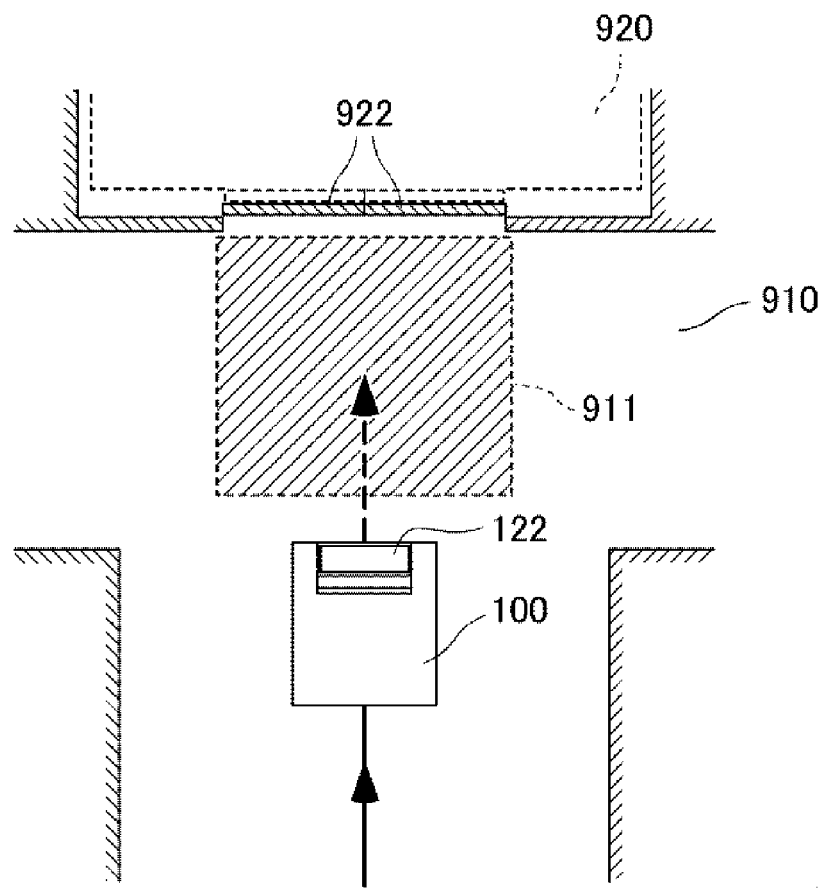
FIG. 3 is a diagram showing a state in which the mobile robot heads for a waiting area of an elevator.

FIG. 3 is a diagram showing a state in which the mobile robot 100 heads for a waiting area 911 of the elevator. Each of the floors in the facility where it is expected that the mobile robot will move includes a passage 910 where the mobile robot 100 can move, and the arrangement of the passage 910 is described in the environmental map 241. The mobile robot 100 moves in accordance with a movement plan that is made when the movement is started. The moving path is planned in accordance with selection of the passage 910 and depending on whether the elevator is used or not. The elevator is used when, for example, the floor of the starting point is different from that of the destination point.

Each of the floors is provided with an outer door 922 of the elevator, which is closed when the car 920 is not present at the floor. The waiting area 911 is set in an area in front of the outer door 922 in the passage 910. The waiting area 911 is also described in the environmental map 241. The moving path that is made by the mobile robot 100 is determined for each floor when the mobile robot 100 uses the elevator, and the destination point or the starting point of each floor is set to the waiting area 911 in each floor, whereby the paths between floors are connected to each other.

As shown in FIG. 3, for example, the mobile robot 100 that has traveled on the passage 910 as shown by a solid arrow is heading for the waiting area 911 to use the elevator, as shown by a dotted arrow. The position determination unit 201 intermittently determines whether the mobile robot 100 has arrived at the waiting area 911. While it is determined that the mobile robot 100 has not yet arrived, the movement controller 203 causes the mobile robot 100 to travel forward toward the waiting area 911. The waiting area 911 may be set in the environmental map 241 in advance. Alternatively, the waiting area 911 may be set by the mobile robot 100 in accordance with the state of the floor on the spot. When, for example, the outer door 922 is detected, an area in the vicinity of the outer door 922 and where there are no surrounding structure and people may be set as the waiting area 911.

Figure 4:
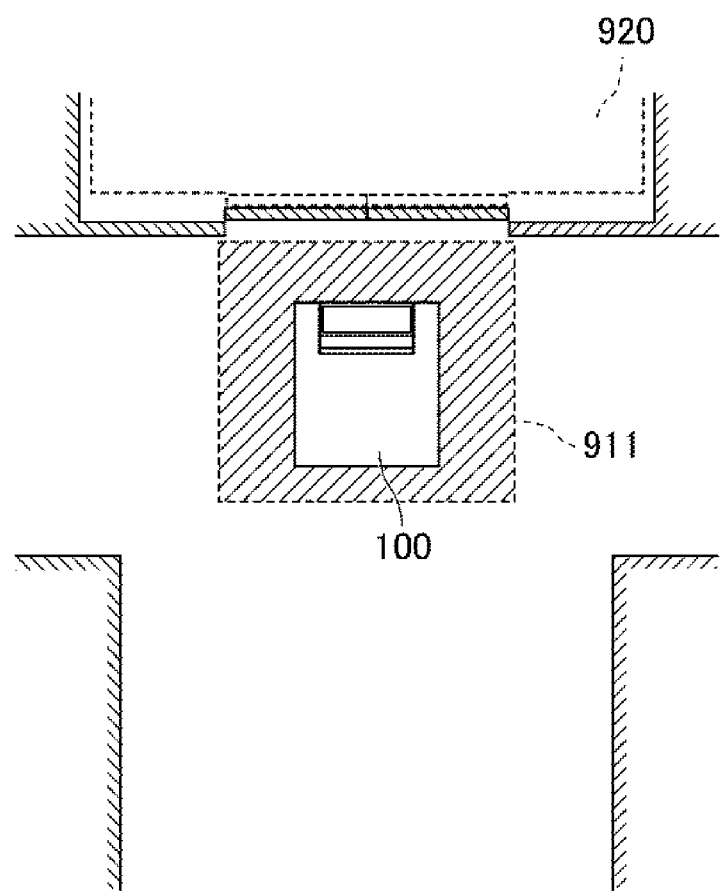
FIG. 4 is a diagram showing a state in which the mobile robot has arrived at the waiting area of the elevator.

FIG. 4 is a diagram showing a state in which the mobile robot 100 arrives at the waiting area 911. When the position determination unit 201 determines that the mobile robot 100 has arrived at the waiting area 911, the movement controller 203 ends the transmission of the driving signal sent to the cart driving unit 210 to stop the mobile robot 100. Then the orientation adjustment unit 202 checks the exiting direction from the car 920 on the destination floor by referring to the environmental map 241.

Since typical elevators include only one inner door provided in a car, the entering direction and the exiting direction are always opposite from each other. As long as the elevator has the aforementioned configuration, the exiting direction in each floor may not be particularly described in the environmental map 241, and the orientation adjustment unit 202 may execute the orientation adjustment on the assumption that the exiting direction is opposite to the entering direction. On the other hand, when, for example, inner doors are provided in two places opposed to each other in the car and the opening door varies depending on the floor, the environmental map 241 describes the exiting direction of each floor. In this case, the orientation adjustment unit 202 checks the exiting direction by referring to the environmental map 241, and adjusts the orientation of the mobile robot 100 in accordance with the results of the check.

Figure 5:
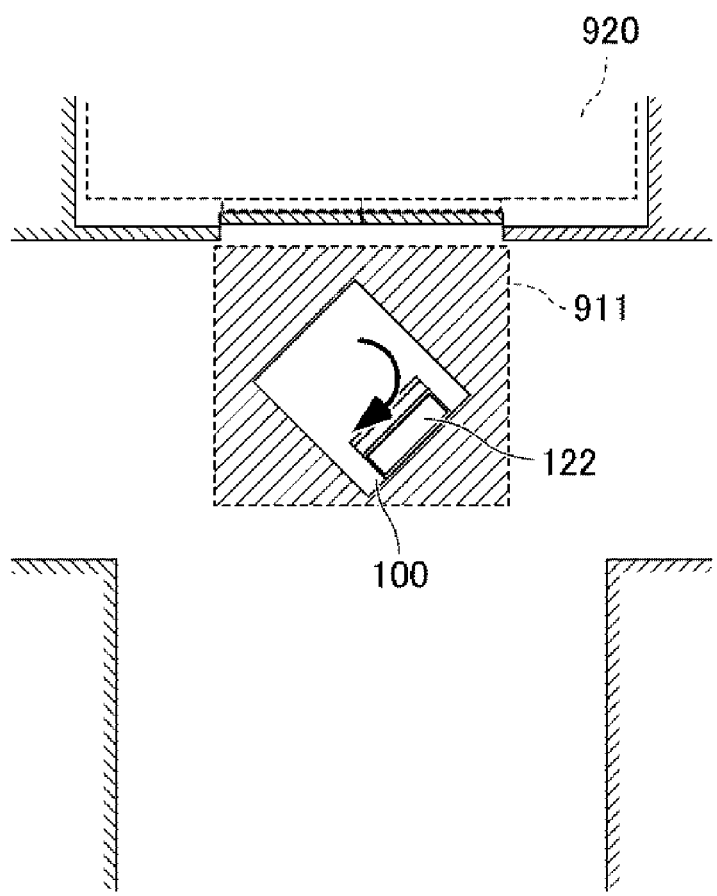
FIG. 5 is a diagram showing a state in which the mobile robot turns.

When the exiting direction is opposite to the entering direction, the orientation adjustment unit 202 starts turning so as to reverse the orientation of the mobile robot 100. FIG. 5 is a diagram showing a state in which the mobile robot 100 turns. When an obstacle has been detected inside a predetermined range (e.g., 2 m) from an outer frame of the mobile robot 100, however, the orientation adjustment unit 202 does not execute the orientation adjustment. According to this configuration, the orientation adjustment unit 202 can prevent people waiting for arrival of the car 920 from contacting the mobile robot 100.

Figure 6:
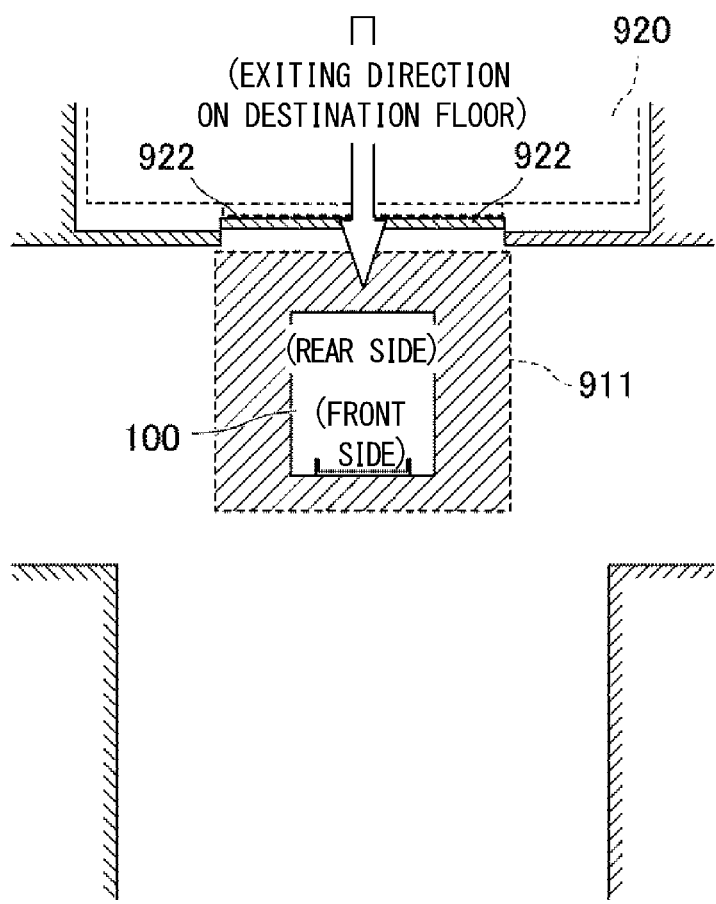
FIG. 6 is a diagram showing a state in which the mobile robot has adjusted its orientation.

FIG. 6 is a diagram showing a state in which the mobile robot 100 has adjusted its orientation. That is, FIG. 6 shows a state in which the front side of the mobile robot 100 is directed toward the exiting direction from the car on the destination floor. In other words, FIG. 6 shows a state in which the rear side of the mobile robot 100 is directed toward the outer door 922. The mobile robot 100 stops in this state and waits for the car 920 to arrive.

Figure 7:
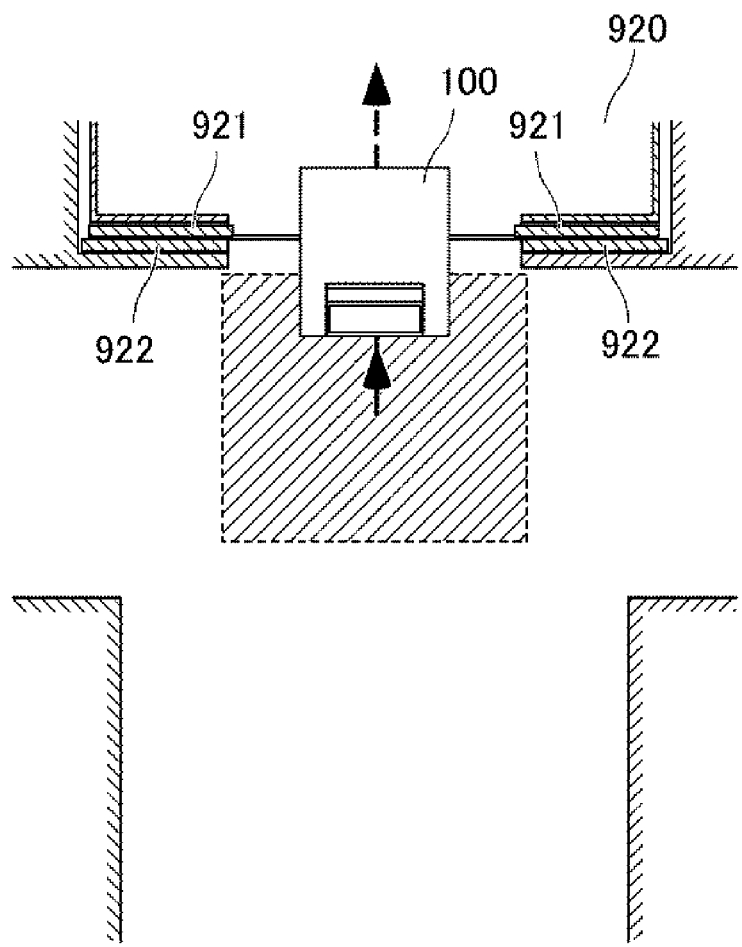
FIG. 7 is a diagram showing a state in which the mobile robot enters a car of the elevator.

FIG. 7 is a diagram showing a state in which the mobile robot 100 enters the car 920 of the elevator. When it is confirmed that the car 920 has arrived at the current floor and the inner door 921 and the outer door 922 have been opened, the movement controller 203 transmits the driving signal to the cart driving unit 210 to cause the mobile robot 100 to enter the car 920 while maintaining the orientation adjusted by turning. In this way, when the mobile robot 100 gets on the car 920 after the orientation of the mobile robot 100 is adjusted in accordance with the exiting direction, it is possible to avoid inconveniences that may occur when the mobile robot 100 exits backwards, and the mobile robot 100 is able to smoothly exit from the car 920 in a short period of time.

Next, some of the examples of the waiting position of the mobile robot 100 while the car 920 moves up and down will be explained. After the mobile robot 100 enters the car 920 as described above, it moves to one of the waiting positions that will be explained below and waits for the car 920 to arrive at the destination floor on site.

Figure 8:
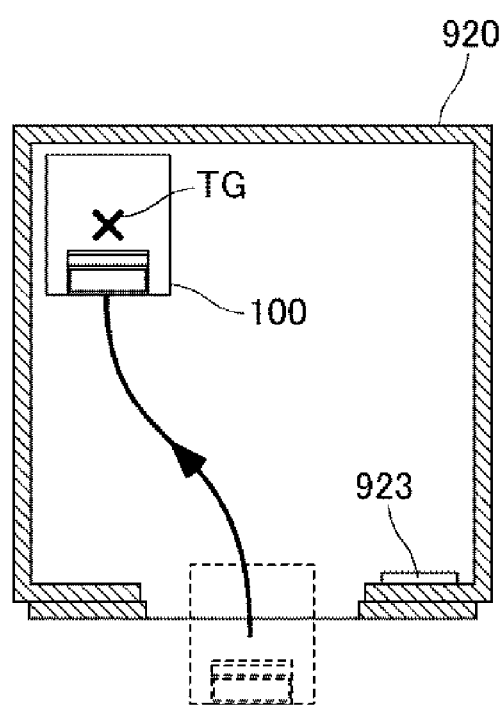
FIG. 8 is a diagram for explaining a first waiting position in the car.

FIG. 8 is a diagram for describing a first waiting position in the car 920. The first waiting position is a position at which the rear part of the mobile robot 100 is opposed to the wall surface of the car 920. After the mobile robot 100 enters the car 920, the movement controller 203 sets a reference position TG of the first waiting position as the destination and moves the mobile robot 100. In this way, when the mobile robot 100 waits with its back against the wall surface, there are no people standing between the wall surface and the mobile robot 100, whereby it is less likely that the mobile robot 100 will disturb people who get on and get off the car. The orientation of the mobile robot 100 in the first waiting position is preferably the same as the orientation thereof when it enters the car 920. When the orientation of the mobile robot 100 in the first waiting position is the same as the orientation thereof when it enters the car 920, as shown in FIG. 8, the generated path from the entering position to the waiting position becomes smooth and the amount of turning that is required during the movement is reduced, whereby the mobile robot 100 is able to move relatively safely even in a case in which there is a person who has already got on the car 920.

Further, the first waiting position is preferably set in a space where an operation panel 923 operated by a person to specify the destination floor is not provided, not in a space where this operation panel 923 is provided. When a person gets on the car, this person operates the operation panel 923. Therefore, when the first waiting position is set in the space where the operation panel 923 is not provided, the mobile robot 100 is less likely to disturb people who get on the car.

Figure 9:
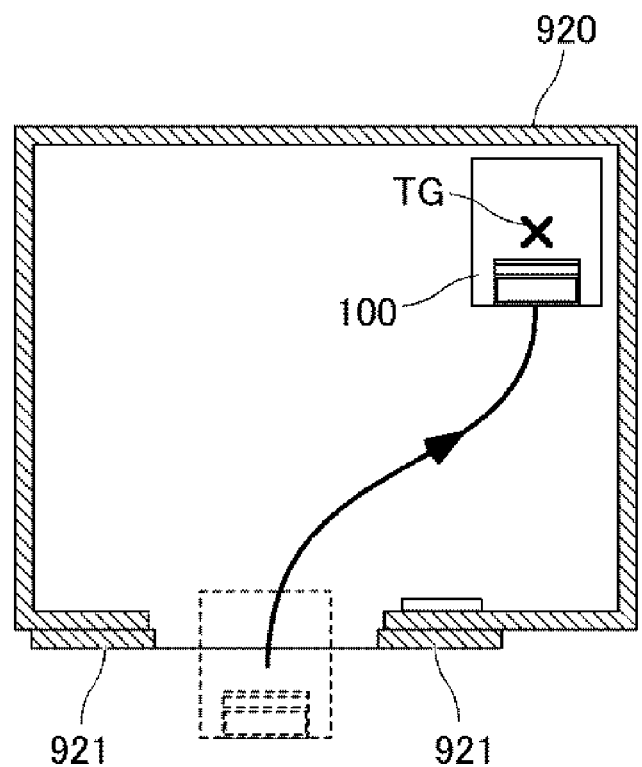
FIG. 9 is a diagram for explaining a second waiting position in the car.

FIG. 9 is a diagram for describing a second waiting position in the car 920. When the car 920 is an asymmetric space when the car 920 is seen from the inner door 921, the second waiting position is set on a side where there is a wide space when the car 920 is seen from the inner door 921. After the mobile robot 100 enters the car 920, the movement controller 203 sets the reference position TG of the second waiting position as the destination and moves the mobile robot 100. When the mobile robot 100 waits in the place where there is a large space, it is possible to reduce a feeling of pressure that people riding the elevator along with the autonomous moving body may have. In this case as well, a position at which the rear part of the mobile robot 100 is opposed to the wall surface of the car 920 is preferably set as the waiting position. Further, the orientation of the mobile robot 100 in the second waiting position is preferably the same as the orientation thereof when it enters the car 920.

Figure 10:
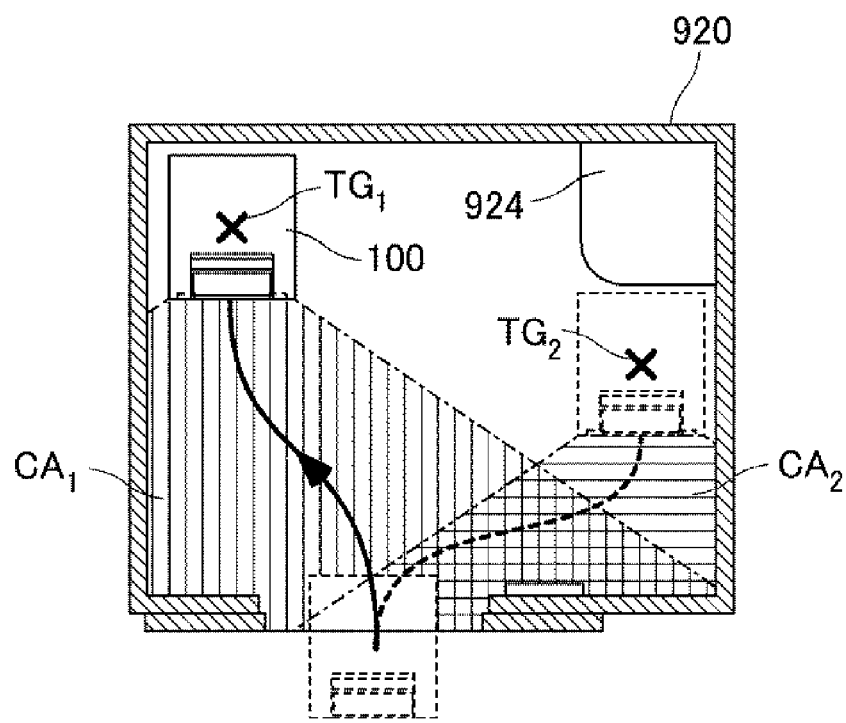
FIG. 10 is a diagram for explaining a third waiting position in the car.

FIG. 10 is a diagram for describing a third waiting position in the car 920. The third waiting position is a position at which the stereo camera 131 can capture images of a range wider than a predetermined reference range. As shown in FIG. 10, when the car 920 is an asymmetric space when the car 920 is seen from the inner door 921 and a stool 924 on which a person who gets on the car 920 sits is provided at a back side of the car 920 on a side of the car 920 where there is a large space, if a position near the stool 924 is set as the waiting position, the stereo camera 131 can capture images of only a limited range. Specifically, the image-capturing range when the mobile robot 100 is caused to move to this reference position $TG_2$ and wait is a range of $CA_2$, which is shown by transverse lines.

On the other hand, the image-capturing range when the mobile robot 100 is caused to move to a reference position $TG_1$ that is set at a further back side of the car 920 and wait is a range of $CA_1$, which is shown by vertical lines. As will be clear from FIG. 10 as well, the range of $CA_1$ is wider than that of $CA_2$. The movement controller 203 finds, for example, a position at which the stereo camera 131 is able to capture images of a range wider than a reference range set to be, for example, a range of 30% in the car 920 by referring to the environmental map 241, and sets this position as the third waiting position. After the mobile robot enters the car 920, the movement controller 203 sets the reference position $TG_1$ of the third waiting position as the destination and moves the mobile robot 100. When the stereo camera 131 is able to capture images of a wider range, as described above, the controller 200 is able to appropriately know the state in the car 920, whereby the mobile robot 100 is able to smoothly exit from the car 920 while appropriately avoiding people who get on the car 920.

Note that one of the aforementioned positions may be set as the waiting position, or a position that satisfies a larger number of conditions may be set as the waiting position. Further, when one of the conditions is met but the other conditions are not met, priorities may be set in advance for each condition, and a position that corresponds to a condition with higher priority may be set as the waiting position.

Figure 11:
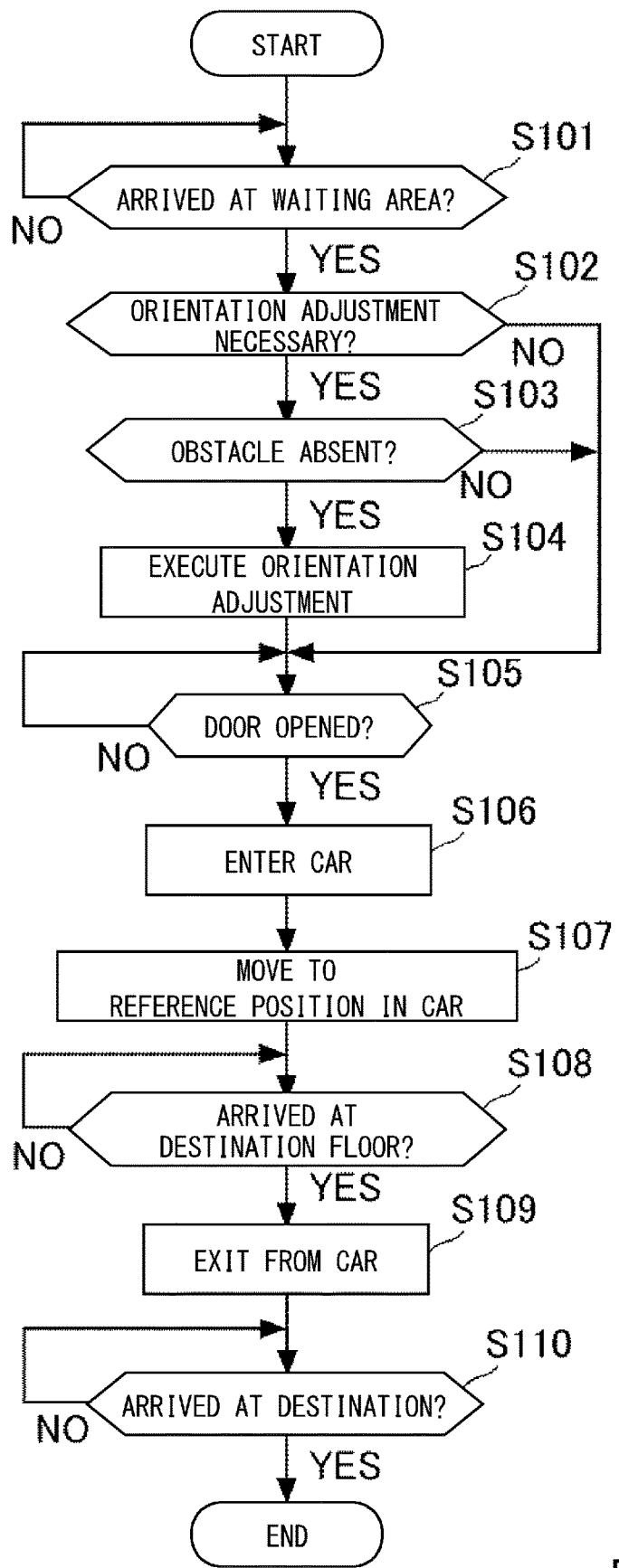
FIG. 11 is a flowchart showing a process flow regarding movement of a mobile robot.

Next, regarding processing that relates to the movement of the mobile robot 100, processing that relates to use of the elevator will be mainly explained. FIG. 11 is a flowchart showing a process flow regarding the movement of the mobile robot 100. In the flowchart shown in FIG. 11, a moving path to the destination set in a floor different from the current floor is set, and the flow starts from the timing when the mobile robot 100 has started movement along this moving path.

The position determination unit 201 periodically identifies the current location of the mobile robot 100 by comparing the information from the sensor unit 230 with the environmental map 241. In Step S101, the position determination unit 201 determines whether the mobile robot 100 has arrived at the waiting area 911 that is on the floor to which the mobile robot 100 is currently moving. When the position determination unit 201 determines that the mobile robot 100 has not yet arrived at the waiting area 911, the movement controller 203 continues movement along the moving path. When it is determined that the mobile robot 100 has arrived at the waiting area 911, the movement controller 203 stops the movement and the process proceeds to Step S102.

In Step S102, the orientation adjustment unit 202 determines whether the orientation adjustment is necessary. Inner doors are provided, for example, in two places opposed to each other in the car. When the inner door through which the mobile robot enters the car is different from the inner door through which the mobile robot exits from the car, it is determined that the orientation adjustment is not necessary, and the process proceeds to Step S105. On the other hand, when the inner door through which the mobile robot enters the car is the same as the inner door through which the mobile robot exits from the car, it is determined that the orientation adjustment is necessary, and the process proceeds to Step S103. As described above, when only one inner door is provided, the above determination is not performed, and the process proceeds to Step S103.

In Step S103, the orientation adjustment unit 202 checks whether an obstacle is detected inside a predetermined range from an outer frame of the mobile robot 100. When the obstacle is detected, the orientation adjustment is not performed, and the process proceeds to Step S105. When the obstacle is not detected, the process proceeds to Step S104, where the orientation adjustment unit 202 turns the mobile robot 100 in such a way that the exiting direction from the car on the destination floor coincides with the direction of the front side of the mobile robot 100, as described above. When the orientation adjustment is completed, the process proceeds to Step S105.

In Step S105, the mobile robot 100 waits for arrival of the car 920. Note that calling of the car 920 is executed via the communication unit 250 at an appropriate timing before Step S105. The controller 200 determines whether the called car 920 has arrived depending on whether the inner door 921 and the outer door 922 have opened. When it is determined that the inner door 921 and the outer door 922 have opened, the process goes to Step S105.

In Step S106, the movement controller 203 causes the mobile robot 100 to enter the car 920. When the orientation adjustment is executed in Step S104, the movement controller 203 causes the mobile robot 100 to enter the car 920 while maintaining its orientation. Further, the process proceeds to Step S107, where the movement controller 203 moves the mobile robot 100 to the reference position in the car 920 that corresponds to the waiting position set as described above. After that, the mobile robot 100 waits until the car 920 arrives at the destination floor. In Step S108, the controller 200 communicates with the system server via the communication unit 250 and checks whether the car 920 has arrived at the destination floor. After the car 920 arrives at the destination floor, the process goes to Step S109.

In Step S109, the movement controller 203 exits from the car 920 and starts movement in the passage 910 on the destination floor. In Step S110, the position determination unit 201 determines whether the mobile robot 100 has arrived at the set destination. When it is determined that the mobile robot 100 has not yet arrived at the destination, the movement along the moving path is continued. When the mobile robot 100 arrives at the set destination, the movement of the mobile robot 100 is stopped and a series of processes is ended. When a moving path along which the mobile robot 100 further moves to another floor using the elevator is set, the process returns to Step S101, where the processing is continued.

Figure 12:
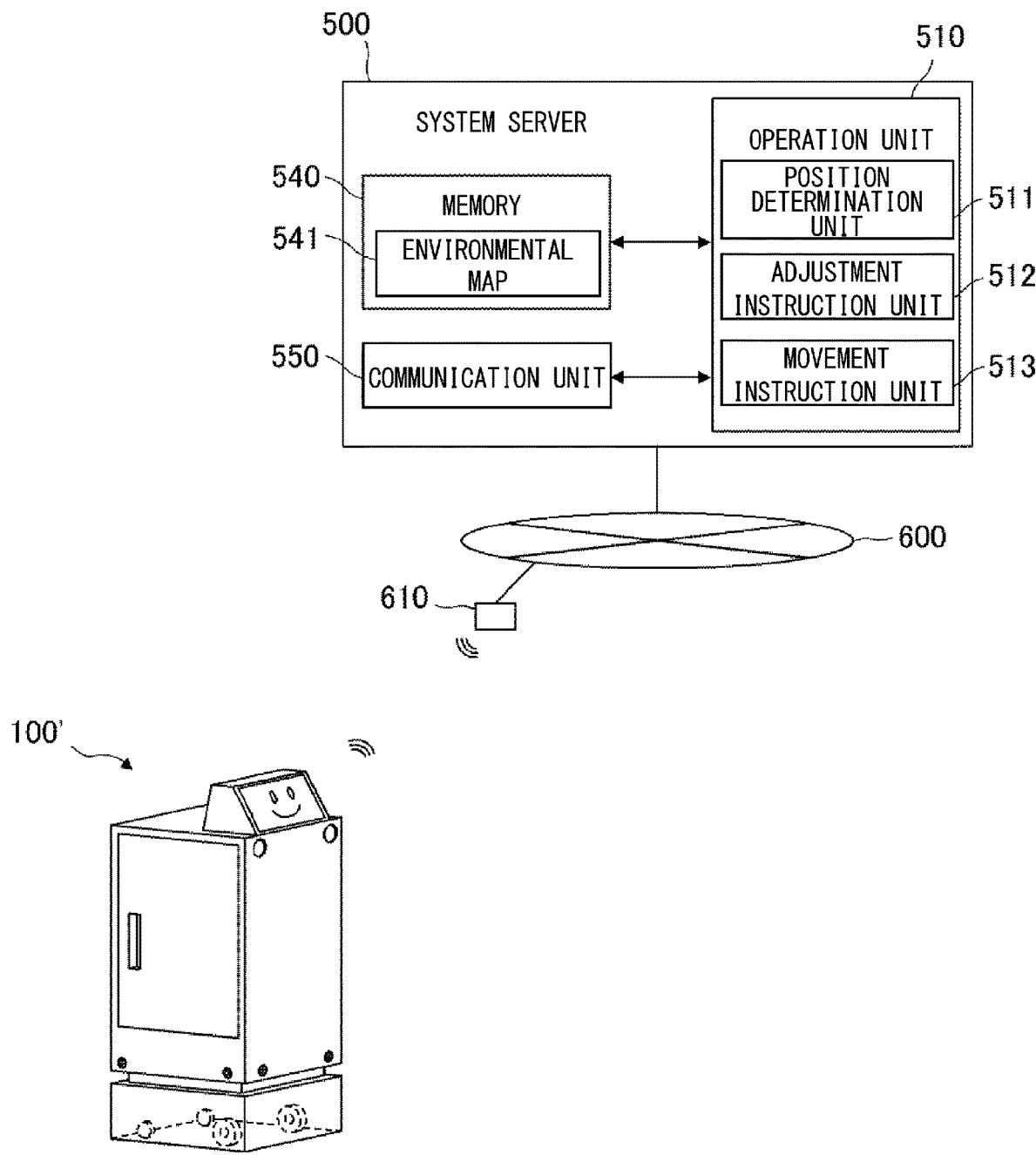
FIG. 12 is a diagram for explaining other embodiments.

The mobile robot 100 described above executes various kinds of processing regarding autonomous movement. However, another embodiment in which the mobile robot executes only simple moving processing in response to a command sent from the system server installed in a remote place in order to reduce the processing of the mobile robot may be employed. FIG. 12 is a diagram for describing a mobile robot system according to this embodiment. The mobile robot system includes a system server 500, and a mobile robot 100' connected to the system server 500 via a network 600 and a communication unit 610.

The system server 500 includes an operation unit 510, a memory 540, and a communication unit 550. The operation unit 510 is, for example, a CPU, and controls the entire system by executing a control program loaded from the memory 540.

The memory 540, which is a nonvolatile storage medium, may be, for example, a hard disc drive. The memory 540 stores, besides the control program for controlling the mobile robot system, various parameter values, functions, lookup tables and the like to be used for control. In particular, the memory 540 stores an environmental map 541 which describes map information in a facility where the mobile robot 100' autonomously moves. The communication unit 250 is a communication device to be connected to the network 600. The operation unit 510 transmits and receives various instruction signals and information to and from the mobile robot 100' via the communication unit 550, the network 600, and a communication unit 610, which is, for example, a wireless LAN unit, installed in the facility.

The operation unit 510, which serves as a function operation unit, also functions as a position determination unit 511, an adjustment instruction unit 512, and a movement instruction unit 513. The position determination unit 511 acquires information from the sensor unit 230 of the mobile robot 100' and determines the current location of the mobile robot 100' by comparing the information from the sensor unit 230 of the mobile robot 100' with the environmental map 541 stored in the memory 540. The position determination unit 511 determines, in particular, that the mobile robot 100' has arrived at the waiting area set in the current floor before the mobile robot 100' gets on the car of the elevator. The position determination unit 511 substantially plays a function that the position determination unit 201 of the mobile robot 100 plays. When the mobile robot 100' autonomously defines the waiting area 911 in accordance with the state of the floor, the position determination unit 511 acquires information at the point defined to be the waiting area 911 and information indicating that the mobile robot 100' has arrived at this point from the mobile robot 100'. Upon acquiring these information items, the position determination unit 511 determines that the mobile robot 100' has arrived at the waiting area on the current floor.

The adjustment instruction unit 512 transmits, to the mobile robot 100', an adjustment instruction for adjusting the orientation of the mobile robot 100' based on the exiting direction from the car on the destination floor when the position determination unit 511 determines that the mobile robot 100' has arrived at the waiting area. The adjustment instruction unit 512 substantially plays a function that the orientation adjustment unit 202 of the mobile robot 100 has played. The mobile robot 100' receives the adjustment instruction from the adjustment instruction unit 512 and adjusts the orientation of the mobile robot 100'.

The movement instruction unit 513 transmits a movement instruction to the mobile robot 100' in such a way that the mobile robot 100' moves along the determined moving path. In particular, when the car arrives, the movement instruction unit 513 transmits, to the mobile robot 100', a movement instruction for causing the mobile robot 100' to enter the car while maintaining the orientation adjusted by the instruction from the adjustment instruction unit 512.

In the mobile robot system thus constructed as well, the mobile robot 100' may operate in a way similar to that in the aforementioned mobile robot 100. In this case, since the mobile robot 100' may execute calculation processing whose processing load is relatively light, it is possible to easily construct the mobile robot 100'.

The control program mentioned above can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An autonomous moving body configured to autonomously move between floors using an elevator installed in a facility, the autonomous moving body comprising:
   a determination unit configured to determine that the autonomous moving body has arrived at a waiting area on a current floor before the autonomous moving body gets on a car of the elevator;
   an orientation adjustment unit configured to adjust, when the determination unit determines that the autonomous moving body has arrived at the waiting area, an orientation of the autonomous moving body based on an exiting direction from the car on a destination floor; and
   a movement controller configured to cause, after the car arrives on the current floor and the orientation adjustment of the autonomous moving body is completed, the autonomous moving body to enter the car while maintaining the orientation adjusted by the orientation adjustment unit.

2. The autonomous moving body according to claim 1, wherein the orientation adjustment unit causes the autonomous moving body to turn and adjusts the orientation of the autonomous moving body in such a way that the exiting direction corresponds to a front side of the autonomous moving body.

3. The autonomous moving body according to claim 1, wherein the orientation adjustment unit causes the autonomous moving body to turn and adjusts the orientation of the autonomous moving body based on an arrangement of an environmental sensor provided in the autonomous moving body.

4. The autonomous moving body according to claim 1, wherein the orientation adjustment unit causes the autonomous moving body to turn and adjusts the orientation of the autonomous moving body based on an arrangement of a display panel provided in the autonomous moving body.

5. The autonomous moving body according to claim 1, wherein the orientation adjustment unit causes the autonomous moving body to turn and adjusts the orientation of the autonomous moving body based on a shape of a housing of the autonomous moving body.

6. The autonomous moving body according to claim 1, wherein the movement controller sets, after the autonomous moving body enters the car, a position at which a rear part of the autonomous moving body is opposed to a wall surface of the car as a destination and causes the autonomous moving body to move.

7. The autonomous moving body according to claim 1, wherein, when the car is an asymmetric space when the car is seen from a door, the movement controller sets, after the autonomous moving body enters the car, a side of the car on which there is a wide space when the car is seen from the door as a destination and causes the autonomous moving body to move.

8. The autonomous moving body according to claim 1, wherein the movement controller sets, after the autonomous moving body enters the car, a position at which a camera provided in the autonomous moving body to acquire environmental information is able to capture images of a range wider than a predetermined reference range as a destination and causes the autonomous moving body to move.

9. The autonomous moving body according to claim 1, wherein the orientation adjustment unit does not adjust the orientation of the autonomous moving body when an obstacle is detected inside a predetermined range from an outer frame of the autonomous moving body.

10. A non-transitory computer readable medium storing a control program of an autonomous moving body configured to autonomously move between floors using an elevator installed in a facility, the control program causing a computer to execute the following steps:

a determination step for determining that the autonomous moving body has arrived at a waiting area on a current floor before the autonomous moving body gets on a car of the elevator;

an orientation adjustment step for adjusting, when it is determined in the determination step that the autonomous moving body has arrived at the waiting area, an orientation of the autonomous moving body based on an exiting direction from the car on a destination floor; and an entering step for entering, after the car arrives on the current floor and the orientation adjustment of the autonomous moving body is completed, the car while maintaining the orientation adjusted in the orientation adjustment step.

11. A method of controlling an autonomous moving body that autonomously moves between floors using an elevator installed in a facility, the method comprising:

a determination step for determining that the autonomous moving body has arrived at a waiting area on a current floor before the autonomous moving body gets on a car of the elevator;

an orientation adjustment step for adjusting, when it is determined in the determination step that the autonomous moving body has arrived at the waiting area, an orientation of the autonomous moving body based on an exiting direction from the car on a destination floor; and an entering step for entering, after the car arrives on the current floor and the orientation adjustment of the autonomous moving body is completed, the car while maintaining the orientation adjusted in the orientation adjustment step.

12. A system server for controlling an autonomous moving body that autonomously moves between floors using an elevator installed in a facility from a remote place, the system server comprising:

a determination unit configured to determine that the autonomous moving body has arrived at a waiting area on a current floor before the autonomous moving body gets on a car of the elevator based on environmental sensor information of the autonomous moving body received from the autonomous moving body;

an adjustment instruction unit configured to transmit, to the autonomous moving body, when the determination unit determines that the autonomous moving body has arrived at the waiting area, an adjustment instruction for adjusting an orientation of the autonomous moving body based on an exiting direction from the car on a destination floor; and a movement instruction unit configured to transmit, after the car arrives on the current floor and the orientation adjustment of the autonomous moving body is completed, a movement instruction for causing the autonomous moving body to enter the car while maintaining the orientation adjusted by an instruction from the adjustment instruction unit to the autonomous moving body.

* * * * *